(12) United States Patent
Barkac et al.

(10) Patent No.: US 6,376,608 B1
(45) Date of Patent: Apr. 23, 2002

(54) CURABLE POWDER FILM-FORMING COMPOSITION HAVING IMPROVED CHEMICAL RESISTANCE

(75) Inventors: Karen A. Barkac, Murrysville; Roxalana L. Martin; Douglas W. Maier, both of Pittsburgh, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/372,566

(22) Filed: Aug. 11, 1999

(51) Int. Cl.[7] .................................................. C08F 8/30
(52) U.S. Cl. ........................ 525/124; 525/221; 525/222; 525/403; 525/404; 525/408; 525/528; 525/529; 525/530
(58) Field of Search ................................. 525/124, 221, 525/222, 403, 404, 408, 528, 529, 530

(56) References Cited

U.S. PATENT DOCUMENTS

| | | | |
|---|---|---|---|
| 3,893,977 A | 7/1975 | Wingler | 260/77.5 TB |
| 4,147,679 A | 4/1979 | Scriven et al. | 260/29.2 TN |
| 4,220,679 A | 9/1980 | Backhouse | 427/401 |
| 4,403,003 A | 9/1983 | Backhouse | 427/407.1 |
| 5,071,904 A | 12/1991 | Martin et al. | 524/458 |
| 5,492,955 A | 2/1996 | Wamprecht et al. | 525/375 |
| 5,710,214 A | 1/1998 | Chou et al. | 525/124 |

FOREIGN PATENT DOCUMENTS

| | | |
|---|---|---|
| DE | 3010874 | 10/1981 |
| EP | 0 728 782 A1 | 8/1996 |
| JP | 55-36259 | 3/1980 |
| JP | 55-45759 | 3/1980 |
| JP | 7-48529 | 2/1995 |

*Primary Examiner*—Peter D. Mulcahy
(74) *Attorney, Agent, or Firm*—Deborah M. Altman; Ann Marie Cannoni

(57) ABSTRACT

A curable powder film-forming composition which includes:
(a) about 55 to 80 percent by weight based on the total weight of resin solids in the film forming composition, of an epoxy functional copolymer having a $T_g$ of about 77° F. to about 158° F. formed by free radical initiated polymerization of:
  (i) about 25 to about 75 percent by of a glycidyl functional ethylenically unsaturated monomer, and
  (ii) about 25 to about 75 percent by weight of a copolymerizable ethylenically unsaturated monomer or mixture of monomers free of glycidyl functionality;
(b) about 15 to about 35 percent by weight of a polycarboxylic acid; and
(c) about 1.0 to about 4.0 percent by weight of a polyisocyanate at least partially capped with a capping agent. A multi-component composite coating composition is also provided, which includes a pigmented film-forming base coat and a transparent top coat of the film-forming composition described above.

10 Claims, No Drawings

CURABLE POWDER FILM-FORMING COMPOSITION HAVING IMPROVED CHEMICAL RESISTANCE

FIELD OF THE INVENTION

The present invention relates to a curable powder film-forming composition having improved resistance to chemical attack such as acid, as well as multi-component composite coating compositions comprising a pigmented or colored base coat and a transparent or clear topcoat.

BACKGROUND OF THE INVENTION

In recent years, powder coatings have become increasingly popular in the automotive coatings industry because these coatings are inherently low in volatile organic content (VOC), which significantly reduces air emissions during the application process. Epoxy condensation polymers, vinyl chloride polymers and acrylic resins have been used as the main film-forming polymers for these coatings. The advantage of the acrylic resin system over the epoxy condensation polymers and vinyl chloride polymers is that acrylic resins provide superior outdoor durability, are more resistant to heat and have better solvent and chemical resistance. The use of glycidyl functional acrylic resins provide such desired properties.

There is a need to apply powder coatings compositions in the automotive original equipment manufacturing (OEM) process. In today's competitive market, automobile manufacturers are placing stricter requirements on coatings properties and performance. Good exterior durability, acid etch and water spot resistance, and excellent gloss and appearance are typical examples. Currently, these properties an be achieved using epoxy-acid cured liquid coatings. However, liquid coatings have significantly higher VOC levels than powder coatings which essentially have zero VOC levels.

Although epoxy-acid systems are known for powder coatings, they are presently not widely used commercially for automotive OEM clear coatings in color-plus-clear composite systems because of inferior appearance such as yellowing, poor flow, and poor cured film properties. Poor appearance is frequently due to the composition of the base coat used underneath the powder clear coat. Attempts to improve cured film properties such as chemical resistance have included addition of auxiliary curing agents or other resinous additives, which may lead to gas evolution or aggravation of yellowing.

U.S. Pat. No. 5,710,214 discloses a curable powder film-forming composition comprising a glycidyl functional acrylic copolymer, a polycarboxylic acid and a blocked polyisocyanate, present at about 17 to 34 percent by weight so as to participate significantly in crosslinking mechanisms. Powder film-forming compositions containing blocked polyisocyanates at such high levels may be prone to yellowing, and when used in a multi-component composite coating composition over a waterborne base coat, may exhibit undesirable gas evolution.

It is desirable to provide an epoxy-acid powder coating composition and a color-plus-clear composite coating system utilizing an epoxy-acid powder clear coating and having improved appearance, flow, stability, and cured film properties such as chemical resistance without the drawbacks of the prior art.

SUMMARY OF THE INVENTION

In accordance with the present invention, a curable powder film-forming composition is provided. The composition comprises a solid, particulate mixture of the following ingredients:

(a) about 55 to about 80 percent by weight based on the total weight of resin solids in the film-forming composition, of an epoxy functional copolymer having a $T_g$ of about 77° F. to about 158° F. (about 25° C. to about 70° C.) formed by polymerizing under free radical initiated polymerization conditions:
  (i) about 25 to about 75 percent by weight based on the total weight of (i) and (ii) of a glycidyl functional ethylenically unsaturated monomer, and
  (ii) about 25 to about 75 percent by weight based on the total weight of (i) and (ii) of a copolymerizable ethylenically unsaturated monomer or mixture of monomers free of glycidyl functionality;

(b) about 15 to about 35 percent by weight based on the total weight of resin solids in the film-forming composition, of a polycarboxylic acid; and (c) about 1.0 to about 5.0 percent by weight based on the total weight of resin solids in the film-forming composition, of a polyisocyanate at least partially capped with a capping agent. Note that the total amounts of (a), (b), and (c) may not equal 100 percent, particularly when used at preferred levels, due to the presence of resinous additives.

Also provided is a multi-component composite coating composition comprising a base coat deposited from a pigmented film-forming composition and a transparent top coat applied over the base coat wherein the transparent top coat is deposited from a clear film-forming composition and is the curable powder film-forming composition described above.

Other than in the operating examples, or where otherwise indicated, all numbers expressing quantities of ingredients, reaction conditions, and so forth used in the specification and claims are to be understood as being modified in all instances by the term "about".

DETAILED DESCRIPTION OF THE INVENTION

The curable powder film-forming composition of the present invention comprises (a) an epoxy functional copolymer, (b) a polycarboxylic acid, and (c) a polyisocyanate at least partially capped with a capping agent.

The epoxy functional copolymer is prepared by copolymerizing one or more glycidyl functional ethylenically unsaturated monomers such as glycidyl acrylate, glycidyl methacrylate, 3,4-epoxycyclohexylmethyl(meth)acrylate, 2-(3,4-epoxycyclohexyl)ethyl(meth)acrylate, or allyl glycidyl ether with an ethylenically unsaturated monomer or mixture of monomers free of glycidyl functionality. Glycidyl methacrylate is the preferred epoxy functional monomer.

In the practice of the invention, the glycidyl functional monomer is typically copolymerized with at least one other monomer having a $T_g$ greater than about 200° F. (about 93° C.). By this is meant that a homopolymer of a given monomer has a $T_g$ of at least about 93° C. $T_g$ as used for the monomer herein refers to actually measured values. Differential scanning calorimetry (DSC) can be used to determine $T_g$ (rate of heating is 18° F. (10° C.) per minute, $T_g$ taken-at-the first inflection point). A high $T_g$ monomer is important because it prevents caking and instability problems associated with powder coatings. Suitable monomers include methyl methacrylate and styrene.

In addition to the glycidyl functional ethylenically unsaturated monomer and high $T_g$ monomers, a different copolymerizable ethylenically unsaturated monomer or mixture of monomers can also be used to prepare the epoxy functional copolymer of (a). Examples of such monomers include esters of acrylic acid or methacrylic acid such as ethyl acrylate, propyl acrylate, n-butyl acrylate, isobutyl acrylate, t-butyl acrylate, 2-ethylhexyl acrylate, ethyl methacrylate, propyl methacrylate, n-butyl methacrylate, isobutyl methacrylate, t-butyl methacrylate, 2-ethylhexyl methacrylate, and so forth. Cyclic esters such as cyclopentyl methacrylate, cyclohexyl methacrylate, methylcyclohexylmethacrylate, trimethylcyclohexyl methacrylate, norbornylmethacrylate, norbornylmethyl methacrylate, isobornyl methacrylate, and their corresponding acrylates, as well as hydroxyalkyl esters such as 2-hydroxyethyl acrylate or methacrylate, 2-hydroxypropyl acrylate or methacrylate may also be used. In addition, vinyl aliphatic or vinyl aromatic compounds other than alpha-methyl styrene dimer which is considered a chain transfer agent, such as acrylonitrile or methacrylonitrile can be used.

The copolymer can be prepared by traditional free radical initiated polymerization techniques using suitable catalysts which include organic peroxides and azo type compounds and chain transfer agents such as alpha-methyl styrene dimer and tertiary dodecyl mercaptan.

The copolymer usually contains between (i) about 25 to about 75 percent by weight, based on weight of the copolymer, of the glycidyl functional ethylenically unsaturated monomer and usually between (ii) about 25 to about 75 percent of a copolymerizable ethylenically unsaturated monomer or mixture of monomers free of glycidyl functionality; the percentages by weight based on total weight of (i) and (ii). Preferably, the copolymer contains (i) about 35 to about 55 percent by weight of the glycidyl functional monomer, (ii) about 35 to about 50 percent by weight of one or more copolymerizable ethylenically unsaturated monomers having a $T_g$ greater than about 200° F. (about 93° C.); and (iii) about 1 to about 30 percent by weight of one or more additional copolymerizable monomers different from (i) and (ii); the percentage by weight being based on the weight of (i), (ii), and (iii). Note that the total amounts of (i), (ii), and (iii) equal 100 percent.

A particularly preferred epoxy functional copolymer suitable for use as component (a) in the curable powder film-forming composition of the present invention comprises about 50 percent by weight glycidyl methacrylate, about 35 percent by weight methyl methacrylate, about 10 percent by weight butyl methacrylate, and about 5 percent by weight styrene, based on the total solid weight of monomers used to prepare the epoxy functional copolymer.

The $T_g$ of the copolymer contributes to the stability of the powder coating composition. The higher the $T_g$ of the copolymer, the better the stability of the coating. $T_g$ is described in PRINCIPLES OF POLYMER CHEMISTRY (1953), Cornell University Press. $T_g$ as used for the copolymer herein refers to actually measured values. The $T_g$ of the copolymer is typically between about 77° F. and about 158° F. (about 25° C. and about 70° C.), and more preferably between about 95° F. and about 131° F. (about 35° C. and about 55° C.).

The epoxy functional copolymer typically has a number average molecular eight typically between about 1000 and about 5000. The preferred number average molecular weight for the epoxy functional copolymer is between about 1000 and about 2500.

The epoxy functional copolymer typically has a calculated epoxy equivalent weight of about 150 to about 700, preferably about 250 to about 450, based on resin solids.

The epoxy functional copolymer of (a) is present in the curable powder film-forming composition in amounts of about 55 to about 80, preferably about 60 to about 70, and more preferably about 65 to about 70 percent by weight based on the total weight of resin solids in the film-forming composition.

As mentioned above, the curable powder film-forming composition of the present invention further comprises a polycarboxylic acid. The polycarboxylic acid of (b) typically serves as a crosslinking agent and usually contains an average of at least two acid groups per molecule, such acid groups being reactive with the polyepoxide to form a crosslinked coating as indicated by its resistance to organic solvent. The parameter of at least two acid groups per molecule is also intended to encompass mixtures of polycarboxylic acids in which di-functional acids are mixed with tri- or higher functionality polyacids. The polycarboxylic acid of (b) may comprise a single polycarboxylic acid or a mixture of two or more polycarboxylic acids.

Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can also be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol and the like, as well as mixtures thereof. The polycarboxylic acids and anhydrides may include those mentioned above, as well as one or more of terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like.

The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted the polyacid crosslinking agent is compatible and soluble in the acrylic copolymer, acting somewhat as a diluent allowing for improved flow and appearance.

The polycarboxylic acid of (b) is present in the curable powder film-forming composition in amounts of about 15 to about 35, preferably about 15 to about 30, and more preferably about 20 to about 25 percent by weight based on the total weight of resin solids in the film-forming composition.

The curable powder film-forming composition of the present invention further comprises a polyisocyanate at least partially capped with a capping agent. The polyisocyanate can be an aliphatic or an aromatic polyisocyanate or a mixture thereof. Diisocyanates are preferred, although higher polyisocyanates can be used in place of or in combination with diisocyanates. Dimers and trimers of polyisocyanates are also suitable.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate, 1,3-bis(1-isocyanato-1-methylethyl)benzene, and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. The polyisocyanate is preferably a solid at ambient temperatures; isophorone diisocyanate is preferred.

Any suitable aliphatic, cycloaliphatic, or aromatic alkyl alcohol may be used as a capping agent for the polyisocyanate in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol. Diols such as dimethylol propane are also suitable.

Other suitable capping agents include oximes such as methyl ethyl ketoxime, acetone oxime and cyclohexanone oxime. A particularly preferred polyisocyanate is isophorone diisocyanate at least partially capped with methyl ethyl ketoxime, available commercially from Hüls America, Inc., as VESTANAT B 1358.

The polyisocyanate of (c) is present in the curable powder film-forming composition in amounts of about 1.0 to about 5.0, preferably about 1.0 to less than 5.0, more preferably about 1.0 to about 4.0, and most preferably about 1.25 to about 2.5 percent by weight based on the total weight of resin solids in the film-forming composition.

The curable powder film-forming composition of the present invention may optionally, and preferably does, contain additives for flow and wetting such as waxes, degassing additives such as benzoin, adjuvant resin to modify and optimize coating properties, ultraviolet (UV) light absorbers and curing catalyst. These optional additives, when present, are used in amounts up to 11.0% by weight based on the total weight of resin solids in the film-forming composition.

The powder coating is typically prepared by blending the epoxy functional copolymer, the polycarboxylic acid, and the capped polyisocyanate for 60–90 seconds in a Henschel blade blender. The powder is then usually extruded through a Baker-Perkins twin screw extruder uncatalyzed at a temperature between 230–235° F. (110–113° C.). Catalyst, such as, methyl dicocoamine, is usually added and the powder blended in the Henschel blender, hammer milled and re-extruded at a temperature between 190–200° F. (87–93° C.). The finished powder can be then classified to a particle size of usually between 20–30 microns in a cyclone grinder/sifter.

The ratio of epoxy functionality to acid functionality is typically between about 0.5:1 and about 1.5:1, and preferably between about 0.7:1 and about 1:1. Ratios of epoxy functionality to acid functionality lower than about 1:1 tend to produce appearance problems in the final film.

Usually, the powder coating composition has a melt viscosity of less than about 5,000 centipoise, preferably less than about 2,500 centipoise and more preferably less than about 2,000 centipoise.

The melt viscosity of the powder coating is measured using a Brookfield Model DV-II viscometer equipped with a #21 spindle. The test is performed by placing the epoxy functional copolymer or powder coating composition in a cell which is then loaded into a heated oven. When the copolymer or powder begins to melt, the #21 spindle is lowered into the cell and rotated. The melt viscosity in centipoise is plotted versus time in minutes. The lowest viscosity recorded, prior to gelling of the copolymer or powder coating, is taken as the melt viscosity. The measurement in centipoise (cps) is taken at the curing temperature of the powder coating, typically 275° F. (135° C.) at 1 revolution per minute (rpm).

Melt viscosity of the powder coating is a measure of flow response. The lower the measured number, i.e., the lower the resistance to flow, the smoother the final film. The powder coating compositions of the present invention are prepared with a high $T_g$ epoxy functional copolymers which provide good stability. The epoxy functional copolymers have a relatively high melt viscosities and yet the melt viscosities of the powder coating compositions are low which results in excellent gloss and appearance of the cured coatings.

The curable powder film-forming composition of the present invention may contain color pigments conventionally used in surface coatings and may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art.

The curable powder film-forming composition of the present invention is preferably used as the clear coat layer in a multi-component composite coating composition such as a "color-plus-clear" coating system, which includes at least one pigmented or colored base coat and at least one clear topcoat. In a color-plus-clear application, a composite coating is applied to a substrate. The process comprises applying to the substrate a pigmented or colored film-forming composition to form a base coat and applying to the base coat a second film-forming composition to form a transparent or clear topcoat over the base coat.

The colored base coat layer used in the "color-plus-clear" coating system of the present invention may be a powder, such as the curable powder film-forming composition of the present invention described above, or a solventborne or waterborne liquid composition. It is preferably a waterborne film-forming composition. The film-forming composition of the base coat typically comprises a polymeric film-forming resin, a crosslinking agent, and a pigment to act as the colorant. Particularly useful polymeric film-forming resins are acrylic polymers, polyesters, including alkyds, and polyurethanes. Generally, these polymers can be any polymers of these types made by any method known to those skilled in the art. When the base coat composition is waterborne, the polymers are water dispersible or emulsifiable and preferably of limited water solubility.

The acrylic polymers are copolymers of one or more alkyl esters of acrylic acid or methacrylic acid optionally together with one or more other polymerizable ethylenically unsaturated monomers. These polymers are generally of the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate. Acrylic polymers can be prepared via aqueous emulsion polymerization techniques and used directly in the preparation of aqueous coating compositions, or can be prepared via organic solution polymerization techniques with groups capable of salt formation such as acid or amine groups. Upon neutralization of these groups with a base or acid the polymers can be dispersed into aqueous medium. Generally, any method of producing such polymers that is known to those skilled in the art utilizing art recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Also, the acrylic polymer can be prepared with N-(alkoxymethyl)acrylamides and N-(alkoxymethyl) methacrylamides.

Besides acrylic polymers, the polymeric film-forming resin for the base coat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol.

Suitable polycarboxylic acids are known to those skilled in the art and include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and preferably the alkyd resins contain a portion of free hydroxyl and/or carboxyl groups which are available for further crosslinking reactions.

Polyurethanes can also be used as the polymeric film-forming resin in the base coat composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The polyester and polyurethane may be prepared with unreacted carboxylic acid groups, which upon neutralization with bases such as amines allows for dispersion into aqueous medium for use in a waterborne coating composition.

Examples of suitable base coat compositions include any commercially available automotive base coat, such as the waterborne compositions disclosed in U.S. Pat. No. 4,403,003, where the polymeric resinous compositions used in preparing these compositions can be used as the polymeric film-forming resin in the practice of this invention. Also, water-based polyurethanes such as those prepared in accordance with U.S. Pat. No. 4,147,679 can be used as the polymeric film-forming resin in the base coat composition. The waterborne base coats described in U.S. Pat. No. 5,071,904 are also suitable.

The polymeric film-forming resin is generally present in the base coat composition in amounts of about 35 to about 75 percent by weight, preferably about 40 to about 60 percent by weight, based on total weight of resin solids in the base coat composition.

The base coat composition further comprises a crosslinking agent which is usually a partially or fully alkylated aminoplast. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formaldehyde condensates etherified with an alcohol containing from one to six carbon atoms.

The crosslinking agent in the base coat composition may alternatively be a polyisocyanate, and may include any of those disclosed above in the discussion of preparation of the polyurethane. Suitable capping agents include any of those disclosed above in the discussion of the capped polyisocyanate.

The crosslinking agent is present in the base coat composition in amounts of about 25 to about 65 percent by weight, preferably about 40 to about 60 percent by weight, based on total weight of resin solids in the base coat composition.

The coating composition used as the base coat in the process of the present invention contains pigments to give it color. In general, the pigment is incorporated into the coating composition in amounts of about 1 to about 80 percent, usually about 1 to about 30 percent by weight based on total weight of the coating composition. Color pigments conventionally used in surface coatings include inorganic pigments such as titanium dioxide, iron oxide, chromium oxide, lead chromate, and carbon black, and organic pigments such as phthalocyanine blue and phthalocyanine green. Metallic flake pigmentation are also useful in the waterborne compositions used in the present invention. Suitable metallic pigments include in particular aluminum flake, copper bronze flake and metal oxide coated mica.

Optional ingredients in the base coat composition are those which are well known in the art of formulating surface coatings and include surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679; 4,403,003; 4,147,769 and 5,071,904.

The base coat compositions can be applied to the substrate by any of the conventional coating techniques such as brushing, spraying, dipping or flowing, but they are most often applied by spraying. The usual spray techniques and equipment for air spraying, airless spray and electrostatic spraying in either manual or automatic methods can be used.

During application of the base coat to the substrate, a film of the base coat is formed on the substrate typically in a thickness of about 0.1 to about 5 and preferably about 0.1 to about 2 mils.

After forming a film of the base coat on the substrate, the base coat can be cured or alternately given a drying step in which solvent, that is, organic solvent and/or water, is driven out of the base coat film by heating or an air drying period before application of the clear coat. Such a drying step is preferably done to prevent migration of various components into the subsequently applied powder clear coat, which may cause yellowing. Suitable drying conditions will depend on the particular base coat composition, and on the ambient humidity with certain waterborne compositions, but in general, a drying time of from about 1 to 15 minutes at a temperature of about 75 to 200° F. (21 to 93° C.) will be adequate.

The clear topcoat composition of the present invention is applied to the base coat by any of the conventional coating techniques mentioned above, although spray applications are preferred. As mentioned above, the clear topcoat can be applied to a cured or dried base coat before the base coat has been cured. In the latter instance, the two coatings are then heated to conjointly harden both layers. Typical curing conditions are at 265 to 300° F. (129 to 149° C.) for 20 to 30 minutes. The clear powder coating thickness is typically about 1 to 6 mils (25.4 to 152.4 microns) in dry film thickness, preferably about 1.5 to 3.5 mils (38.1 to 88.9 microns).

The invention will further be described by reference to the following examples. Unless otherwise indicated, all parts are by weight.

Examples A through F illustrate the preparation of various powder clear coat compositions. Example A is a control and contains no capped polyisocyanate. Examples E and F are comparative, containing amounts of capped polyisocyanate outside the scope of the invention.

Each epoxy-acid powder clear coat composition in Examples A through F was processed in the following manner. The components were blended in a Henschel Blender for 60 to 90 seconds. The mixtures were then extruded through a Werner & Pfleider co-rotating twin screw extruder at a 450 RPM screw speed and an extrudate temperature of 100° C. to 125° C. The extruded material was then ground to a particle size of 17 to 27 microns using an ACM Grinder (Air Classifying Mill from Micron Powder Systems, Summit, N.J.). The finished powders were electrostatically sprayed onto test panels and evaluated for coatings properties.

TABLE I

| Ingredient | Example A Control Formula | Example B *1.25% IPDI/MEKO | Example C 2.5% IPDI/MEKO | Example D 5% IPDI/MEKO | Example E 10% IPDI/MEKO | Example F 17% IPDI/MEKO |
| --- | --- | --- | --- | --- | --- | --- |
| GMA Functional Acrylic[1] | 68.97 | 68.03 | 67.09 | 65.21 | 61.45 | 56.26 |
| DDDA[2] | 22.76 | 22.45 | 22.14 | 21.52 | 20.28 | 18.57 |
| Acrylic resin[3] | 1.10 | 1.10 | 1.10 | 1.10 | 1.10 | 1.0 |
| Benzoin | 0.20 | 0.20 | 0.20 | 0.20 | 0.20 | 0.20 |
| Wax C Micropowder[4] | 0.60 | 0.60 | 0.60 | 0.60 | 0.60 | 0.60 |
| TINUVIN 144[5] | 2.00 | 2.00 | 2.00 | 2.00 | 2.00 | 2.00 |
| CGL 1545[6] | 2.00 | 2.00 | 2.00 | 2.00 | 2.00 | 2.00 |
| HCA-1[7] | 2.00 | 2.00 | 2.00 | 2.00 | 2.00 | 2.00 |
| ARMEEN M2C[8] | 0.37 | 0.37 | 0.37 | 0.37 | 0.37 | 0.37 |
| VESTANAT B1358[9] | 0.00 | 1.25 | 2.50 | 5.00 | 10.00 | 17.00 |
| Total | 100.00 | 100.00 | 100.00 | 100.00 | 100.00 | 100.00 |

*Note that percentages are based on total resin solids
[1]Acrylic resin comprising 50% by weight glycidyl methacrylate, 35% by weight methyl methacrylate, 10% by weight butyl methacrylate, 5% by weight styrene.
[2]Dodecanedioic Acid.
[3]Acrylic resin comprising 2 percent by weight DMAEMA, 16.8 percent by weight hydroxyethyl acrylate, and 81.2 percent by weight 2-ethyl hexyl acrylate
[4]Wax C Micro Powder, a fatty acid amide (ethylene bis-stearoylamide), commercially available from Hoechst-Celanese.
[5]TINUVIN 144 (2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer available from Ciba-Geigy Corp.
[6]CGL-1545 (2-[4((2-Hydroxy-3-(2-ethylhexyloxy) propyl)-oxy]-2-hydroxyphenyl)-4,6-bis(2,4-dimethylphenyl)-1,3,5-tirazine), an ultraviolet light stabilizer available from Ciba-Geigy Corp.
[7]HCA-1, an anti-yellowing agent commercially available from Sanko Chemical Corp.
[8]Methyl dicocoamine available from Akzo-Nobel Corp.
[9]VESTANAT B1358/100, Blocked Polyisocyanate commercially available from Hüls America Inc.

The powder coating compositions of Examples A to F were prepared for testing in the following manner. Test panels, coated with electrocoat primer commercially available from PPG Industries, Inc., as ED5000 were primed and base coated by spray application to a film thickness of 1.1 mils (27.9 microns) and 0.6 mils (15.2 microns) respectively, with black solventborne primer commercially available as M&V Black Primer from Mehnert & Veek, Germany and a black waterborne base coat commercially available as Black II Waterborne Base Coat from BASF, Germany. The base coated panels were then flashed for 10 minutes 176° F. (80° C.) before electrostatically spray applying the powder coating compositions of Examples A to F. The powder compositions were applied to a thickness of 2.6–2.8 mils (66 to 71 microns) and heated for 30 minutes at 293° F. (145° C.). The panels were then tested for acid resistance using the following procedure:

Acid resistance was tested by heating the test panels to 65° C. (±2° C.), adding a 50 micro-liter drop of 36% $H_2SO_4$ after every minute for 30 minutes and then visually inspecting the panels for etch. Test panels are rated visually on a scale of 1 to 10, with 1 indicating poor chemical resistance and 10 indicating excellent resistance. Test results are recorded in Table II below.

TABLE II

| Example | Description | Rating |
| --- | --- | --- |
| Example A | Control | 5 |
| Example B | 1.25% IPDI/MEKO | 6 |
| Example C | 2.5% IPDI/MEKO | 6 |
| Example D | 5% IPDI/MEKO | 7 |
| Example E | 10% IPDI/MEKO | 8 |
| Example F | 17% IPDI/MEKO | * |

*Gassing of the powder clear coat composition over the base coat was severe, and did not allow for accurate measurement of acid resistance.

The data in Table II indicate that as levels of blocked isocyanate increase, acid resistance improves. However, as will be shown by the following test, yellowing of the powder coating increases.

The powder coating compositions of Examples A to F were prepared for yellowing testing in the following manner. Test panels, coated with electrocoat primer commercially available as ED5000 from PPG Industries, Inc., were primed and base coated by spray application to a film thickness of 1.1 mils (27.9 microns) and 0.6 mils (15.2 microns) respectively, with white solventborne primer commercially available as M&V White Primer from Mehnert & Veek, Germany and a white waterborne base coat, commercially available as Alpine White Waterborne Base Coat from BASF, Germany. The base coated panels were then flashed for 10 minutes at 176° F. (80° C.) before electrostatically spray applying the powder coating compositions of Examples A to F. The powder clear coats were applied as a wedge 1.0 to 4.0+mils (25.4 to 101.6 microns) and heated for 30 minutes at 293° F. (145° C.). The panels were then tested for yellowing at 2.5 mils (64 microns) film thickness using the following procedure:

Yellowing was measured using Macbeth Color Eye, examining ΔB at 2.5 mils (64 microns) of powder clear coat. ΔB is a measure of yellowing of the coating. Test panels are rated visually on a scale of 1 to 5, with 1 indicating severe yellowing and 5 indicating minimal yellowing. Test results are recorded in Table III below.

TABLE III

| Example | Description | Rating |
| --- | --- | --- |
| Example A | Control | 4 |
| Example B | 1.25% IPDI/MEKO | 4 |
| Example C | 2.5% IPDI/MEKO | 3 |
| Example D | 5% IPDI/MEKO | 1 |
| Example E | 10% IPDI/MEKO | 1 |
| Example F | 17% IPDI/MEKO | 1* |

*Gassing of the powder clear coat composition over the base coat was severe.

The data in Tables II and III indicate that preferred levels of blocked isocyanate would be 1.25% to 2.5% to provide optimum acid resistance while maintaining acceptable yellowing properties of the clear coat.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A curable powder film-forming composition comprising a solid, particulate mixture of:

(a) about 55 to about 80 percent by weight based on the total weight of resin solids in the film forming composition, of an epoxy functional copolymer having a $T_g$ of about 77° F. to about 158° F. (about 25° C. to about 70° C.) formed by polymerizing under free radical initiated polymerization conditions:

(i) about 25 to about 75 percent by weight based on the total weight of (i) and (ii) of a glycidyl functional ethylenically unsaturated monomer, and (ii) about 25 to about 75 percent by weight based on the total weight of (i) and (ii) of a copolymerizable ethylenically unsaturated monomer or mixture of monomers free of glycidyl functionality;

(b) about 15 to about 35 percent by weight based on the total weight of resin solids in the film forming composition, of a polycarboxylic acid; and (c) about 1.25 to about 2.5 percent by weight based on the total weight of resin solids in the film-forming composition, of a polyisocyanate at least partially capped with a capping agent.

2. The composition of claim 1 wherein the copolymerizable ethylenically unsaturated monomer (ii) is selected from the group consisting of alkyl acrylates, alkyl methacrylates containing from 1 to 20 carbon atoms in the alkyl group, vinyl aromatic compounds and vinyl aliphatic compounds.

3. The composition of claim 1 wherein the epoxy functional copolymer of (a) has a $T_g$ of about 95° F. to about 131° F. (about 35° C. to about 55° C.).

4. The composition of claim 1 wherein the epoxy functional copolymer of (a) has a number average molecular weight of about 1000 to about 5000.

5. The composition of claim 1 wherein the polycarboxylic acid of (b) is a crystalline material containing from 4 to 20 carbon atoms.

6. The composition of claim 5 wherein the polycarboxylic acid of (b) is dodecanedioic acid.

7. The composition of claim 1 wherein the capped polyisocyanate of (c) comprises isophorone diisocyanate at least partially capped with a capping agent.

8. The composition of claim 7 wherein the capping agent is selected from the group consisting of methyl ethyl ketoxime and dimethylol propane.

9. The composition of claim 8 wherein the capping agent is methyl ethyl ketoxime.

10. The composition of claim 1 where (a) is present in an amount of 65 to 70 percent by weight and (b) is present in an amount of 20 to 25 percent by weight each based on the total weight of resin solids in the film-forming composition.

* * * * *